United States Patent
Kopikare et al.

(10) Patent No.: US 8,462,684 B1
(45) Date of Patent: Jun. 11, 2013

(54) POWER SAVING TECHNIQUE FOR A WIRELESS DEVICE

(75) Inventors: Milind Kopikare, San Jose, CA (US); Rahul Kopikare, Mumbai (IN)

(73) Assignee: Marvell International Ltd. (BM)

( * ) Notice: Subject to any disclaimer, the term of this patent is extended or adjusted under 35 U.S.C. 154(b) by 764 days.

(21) Appl. No.: 12/357,926

(22) Filed: Jan. 22, 2009

Related U.S. Application Data (63) Continuation-in-part of application No. 12/123,281, filed on May 19, 2008.

(51) Int. Cl.
*G08C 17/00* (2006.01)

(52) U.S. Cl.
USPC ......... 370/311; 370/350; 455/127.4; 455/574

(58) Field of Classification Search
USPC ................. 370/311, 331, 338, 350; 455/39
See application file for complete search history.

(56) References Cited

U.S. PATENT DOCUMENTS

| | | | |
|---|---|---|---|
| 6,212,224 B1 | 4/2001 | Cammarota et al. | |
| 6,463,307 B1 * | 10/2002 | Larsson et al. | ................. 455/574 |
| 7,242,971 B2 | 7/2007 | Park | |
| 7,414,560 B2 | 8/2008 | Chen et al. | |
| 7,580,634 B2 | 8/2009 | Takeuchi et al. | |
| 8,019,382 B2 | 9/2011 | Rush et al. | |
| 2008/0285690 A1 | 11/2008 | Kwon et al. | |
| 2009/0279897 A1 | 11/2009 | Takeuchi et al. | |
| 2010/0125681 A1 | 5/2010 | Patel | |
| 2010/0246459 A1 * | 9/2010 | Ding et al. | .................... 370/311 |
| 2011/0239256 A1 | 9/2011 | Gholmieh | |

OTHER PUBLICATIONS

U.S. Appl. No. 10/962,376, filed Oct. 8, 2004, M. Kopikare.

* cited by examiner

*Primary Examiner* — Kevin C Harper
*Assistant Examiner* — Henry Baron (57) ABSTRACT

A system and method are disclosed for decreasing the amount of power consumed by a data transmitter in a wireless device when transmitting media (audio and/or visual) data or other data received from a media source or other source. A transmission circuit, such as an application specific integrated circuit (ASIC) or WLAN chip, is configured to deactivate the data transmitter for a deactivation interval and aggregate the media data (or other consistent-rate data) in a buffer while the data transmitter is deactivated. At the end of the deactivation interval, the data transmitter is activated and the aggregated data packets are transmitted. The data transmitter may be repetitively deactivated and activated for transmitting the data. The deactivation interval may be based on the data sampling rate, the transmission rate of the data transmitter, the capacity of the buffer, and/or other factors.

21 Claims, 4 Drawing Sheets

POWER SAVING TECHNIQUE FOR A WIRELESS DEVICE

RELATED APPLICATION

This application is a continuation-in-part and claims the benefit of U.S. application Ser. No. 12/123,281, filed on May 19, 2008, which in turn claims priority to U.S. Provisional Application No. 60/938,816, filed on May 18, 2007, both of which are incorporated herein by reference. This application is related to U.S. application Ser. No. 12/357,915, filed on Jan. 22, 2009.

BACKGROUND

1. Technical Field

The present disclosure relates to the field of wireless devices, and more particularly to decreasing the amount of power used by components of such devices.

2. Related Art

Wireless devices such as lap-top computers, personal digital assistants, multi-media Internet enabled phones, portable media players, and other devices include components, systems, circuits, and/or other hardware that consume device power. The power may be provided by a device battery, as an example. The per-charge life of the battery is dependent upon several factors, including the type and amount of hardware that draws power from the battery, the type and amount of user activity of the device, and the amount of power consumed by components of the device in standby mode. The per-charge life of the battery is considered an important feature and affects a user's level of satisfaction with the device. Thus, maximizing the per-charge battery life of a wireless device is desirable. More generally, conserving power and/or reducing the amount of power consumed by wireless devices, regardless of the source of power, may reduce the cost of device operation, may prolong the life of the device, may lead to an increase in user satisfaction, and/or may have other benefits.

BRIEF SUMMARY

The following embodiments relate to systems and methods for reducing the amount of power consumed by a device's wireless transmitter. Specifically, the device's wireless transmitter is deactivated for deactivation intervals while data packets that are to be transmitted are aggregated in a data transmit buffer. At the end of each deactivation interval, the device's transmitter is activated to transmit the aggregate of data packets. Preferably, the data packets include data that is provided at a consistent data rate that is less than the transmit rate, such as media (audio and/or video) data.

In an embodiment, a method comprises receiving data from a data source at a consistent data rate and forming a plurality of data packets that include the data. The plurality of data packets are aggregated for a predetermined time interval and transmitted wirelessly. The method includes deactivating a data transmitter for a time interval that coincides with the predetermined time interval. The predetermined time interval may be determined based on the rate that the data is received from the data source. The rate may be a sampling rate of media data, as an example. Deactivating the data transmitter may include partially or completely disabling the data transmitter.

The method may also include determining whether the data source is providing consistent-rate data and/or transmitting the aggregated plurality of data packets within a transmit opportunity burst transmission.

An apparatus comprises a memory and a processor. The memory is in communication with a data transmitter. The processor deactivates the data transmitter for a time interval and communicates a plurality of data packets to the memory while the data transmitter is deactivated. The data transmitter is activated by the processor after the time interval to transmit the plurality of data packets as an aggregate. The plurality of data packets may be transmitted within a transmit opportunity burst transmission, as an example.

The processor may determine the time interval based on the rate that the data is received from a data source. The data rate may be a sampling rate of media data, as an example. The time interval may coincide with another, predetermined time interval during which the plurality of data packets are communicated to the memory. An application specific integrated circuit (ASIC) may include the memory, the data transmitter, and the processor.

An apparatus comprises one or more of the following: means for receiving data from a data source at a consistent data rate; means for aggregating a plurality of data packets for a predetermined time interval, wherein the data packets include the data; means for wirelessly transmitting the plurality of data packets as an aggregate; means for deactivating a data transmitter for a time interval, wherein the time interval coincides with the predetermined time interval; means for determining the predetermined time interval based on a data rate of the data received from the data source; means for transmitting the aggregated plurality of data packets within a transmit opportunity burst transmission; and means for determining whether the data source is providing consistent-rate data.

A computer readable storage medium has processor executable instructions to: receive data from a data source at a consistent data rate; aggregate a plurality of data packets for a predetermined time interval, wherein the data packets include the data; wirelessly transmit the plurality of data packets as an aggregate; deactivate a data transmitter for a time interval, wherein the time interval coincides with the predetermined time interval; determine the predetermined time interval based on a data rate of the data received from the data source; partially or completely disable the data transmitter; transmit the aggregated plurality of data packets within a transmit opportunity burst transmission; and/or determine whether the data source is providing consistent-rate data.

A method comprises receiving a first plurality of media data packets and a second plurality of media data packets. The first plurality of media data packets are aggregated in a memory while a wireless data transmitter is deactivated. The wireless data transmitter is activated and the first plurality of media data packets are transmitted as a first aggregate. The method includes aggregating the second plurality of media data packets while the wireless data transmitter is deactivated and transmitting the second plurality of media data packets as a second aggregate. The method may include deactivating the wireless data transmitter for a time interval that is based on a sampling rate of media data and a transmit rate of the wireless data transmitter. The wireless data transmitter may be deactivated if data to be transmitted is media data. The media data may be received while the wireless data transmitter is activated and also while the wireless data transmitter is deactivated. Deactivating the wireless data transmitter may include partially or completely disabling the wireless data transmitter.

An apparatus comprises a wireless data transmitter and a processor. The processor activates the wireless data transmitter to transmit a first plurality of media data packets as a first aggregate and deactivates the wireless data transmitter while a second plurality of media data packets are aggregated in a memory as a second aggregate. The processor activates the wireless data transmitter to transmit the second plurality of media data packets as a second aggregate, different than the first aggregate. The processor may also deactivate the wireless data transmitter for a time interval that is based on a sampling rate of media data and a transmit rate of the wireless data transmitter. The processor may receive media data and form the first and second plurality of media data packets while the wireless data transmitter is activated and while the wireless data transmitter is deactivated. Deactivating the wireless data transmitter may include either partially or completely disabling the data transmitter.

An apparatus comprises one or more of the following: means for receiving a first plurality of media data packets and a second plurality of media data packets; means for aggregating the first plurality of media data packets in a memory while a wireless data transmitter is deactivated; means for activating the wireless data transmitter; means for transmitting the first plurality of media data packets as a first aggregate; means for aggregating the second plurality of media data packets while the wireless data transmitter is deactivated; means for transmitting the second plurality of media data packets as a second aggregate; means for deactivating the wireless data transmitter for a time interval, wherein the time interval is based on a sampling rate of media data and a transmit rate of the wireless data transmitter; means for receiving a signal indicating whether data to be transmitted is media data, and deactivating the wireless data transmitter if the data is media data; means for receiving media data while the wireless data transmitter is activated and while the wireless data transmitter is deactivated; and means for partially or completely disabling the wireless data transmitter.

A computer readable storage medium has processor executable instructions to: receive a first plurality of media data packets and a second plurality of media data packets; aggregate the first plurality of media data packets in a memory while a wireless data transmitter is deactivated; activate the wireless data transmitter; transmit the first plurality of media data packets as a first aggregate; aggregate the second plurality of media data packets while the wireless data transmitter is deactivated; transmit the second plurality of media data packets as a second aggregate; deactivate the wireless data transmitter for a time interval, wherein the time interval is based on a sampling rate of media data and a transmit rate of the wireless data transmitter; deactivate the wireless data transmitter if the data is media data; receive media data while the wireless data transmitter is activated and while the wireless data transmitter is deactivated; and/or completely or partially disable the wireless data transmitter.

An apparatus comprises a processor, a memory, and a wireless data transmitter. The processor forms a plurality of data packets from data received from a data source at a consistent rate. The memory receives and aggregates the plurality of data packets. The wireless data transmitter transmits the aggregated plurality of data packets. The processor may deactivate the wireless data transmitter for a time interval after the wireless data transmitter transmits the aggregated plurality of data packets. An ASIC may include the processor, the memory, and the wireless data transmitter.

A method comprises forming a plurality of data packets from data received from a data source at a consistent rate and storing the plurality of data packets as an aggregate. The method also includes transmitting the aggregated plurality of data packets. The method may also include deactivating the wireless data transmitter for a time interval after the wireless data transmitter transmits the aggregated plurality of data packets.

An apparatus comprises one or more of the following: means for forming a plurality of data packets from data received from a data source at a consistent rate; means for storing the plurality of data packets as an aggregate; means for transmitting the aggregated plurality of data packets; and means for deactivating the wireless data transmitter for a time interval after the wireless data transmitter transmits the aggregated plurality of data packets.

A computer readable storage medium has processor executable instructions to: form a plurality of data packets from data received from a data source at a consistent rate; store the plurality of data packets as an aggregate; transmit the aggregated plurality of data packets; and/or deactivate the wireless data transmitter for a time interval after the wireless data transmitter transmits the aggregated plurality of data packets.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The embodiments will now be described with reference to the attached drawings.

DETAILED DESCRIPTION

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to systems and methods for decreasing the amount of power used by a data signal transmitter and/or a wireless signal receiver in a wireless device. On the data signal transmitter side, power usage by the transmitter is reduced when transmitting media (audio and/or visual) data or any other type of data received from a source that provides data at a consistent rate. A transmission circuit, such as a WLAN interface chip or other ASIC, is configured to deactivate the transmitter for a deactivation interval (sometimes referred to more generally as a "time interval") and aggregate the media data (or other consistent-rate data) in a buffer while the transmitter is deactivated. At the end of the deactivation interval, the transmitter is activated and the aggregated data packets are transmitted. The transmitter may be repetitively deactivated and activated for transmitting aggregated data packets. The deactivation interval may be based on the data sampling rate, the transmission rate of the transmitter, the capacity of the buffer, and/or other factors. Because the transmitter is deactivated in intervals, the battery life of the device, for example, may be increased without affecting the performance of the device.

On the receiver side, power usage by the wireless signal receiver is reduced. Received data is communicated from the receiver to a play-out buffer in communication with a media play-out device. The level of data in the play-out buffer increases when received data is written to the buffer, and the level of data decreases when data is read from the buffer. If the level of data is above a first level, the receiver is transitioned to a sleep mode while data is read from the buffer. When the level of data in the buffer falls below a second (lower) level, the receiver is transitioned back to an active mode to receive data. The receiving device communicates status messages (whether the receiver will be entering sleep mode or is in the active mode) to the transmitting device so that the transmitting device stops transmitting data signals when the receiver is in sleep mode and transmits data signals when the receiver is in active mode. Because the receiver transitions to sleep mode for periods of time while there is data in the play-out buffer, the battery life, for example, of the device having the receiver may be increased without affecting media playback.

Figure 1:
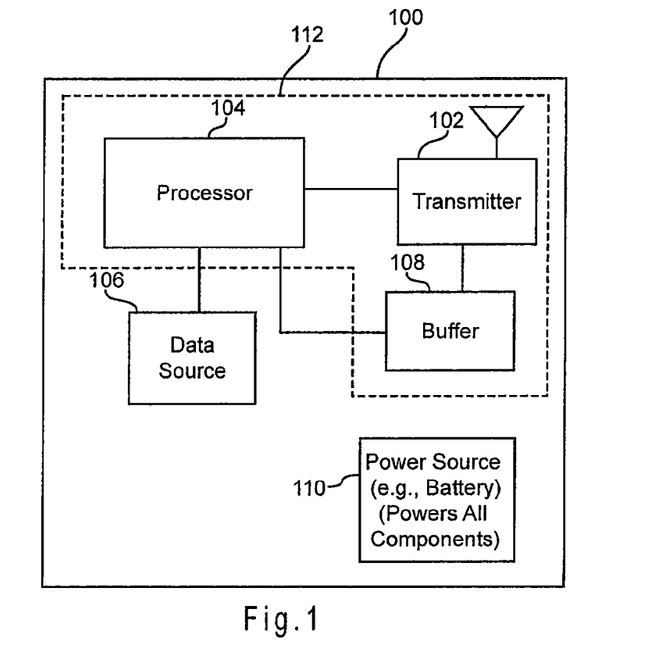
FIG. 1 illustrates a wireless device having a transmission circuit that deactivates a data signal transmitter while aggregating data packets in a buffer, according to an embodiment of the invention.

Turning first to systems and methods for decreasing the amount of power used by a data signal transmitter, FIG. 1 illustrates a wireless device 100 having a transmission circuit 112 that deactivates a data transmitter 102 while aggregating data packets in a buffer 108. The device 100 may be any wireless device such as a lap-top computer, personal digital assistant, multi-media Internet enabled phone, portable media player, a device operable in a wireless local area network (WLAN) or other network, or any other device having a data transmitter 102 and a power source 110. The transmission circuit 112 may be a WLAN interface chip, an ASIC, or other circuit or system having or in communication with a data transmitter 102, as examples.

In the illustrated embodiment, the transmission circuit 112 includes a processor 104 for activating and deactivating the data transmitter 102 in intervals. The processor 104 is in communication with a data source 106. The data source 106 may be any type of data source capable of providing data at a consistent rate (or at least a substantially consistent rate). For example, the data source 106 may be a data communication device, a data storage device, a read-only memory (ROM), a random access memory (RAM), a memory card, a Flash memory, or other memory. The data provided by the data source 106 may be, by way of examples, media data (also referred to as playback data) such as audio data, visual data, audio-visual data, or any other type of data.

The device 100 may include a user interface (not shown) that receives user input and responsively communicates a transmit instruction signal to the processor 104. The transmit instruction signal indicates that data is to be retrieved from the data source 106 and transmitted. In response, in the illustrated embodiment the processor 104 reads the data from the data source 106, forms data packets for wireless transmission, and communicates the data packets to a buffer 108 in communication with the data transmitter 102. The buffer 108 may be any type of memory or data storage device. Hereinafter, the data packets will be referred to as media data packets. However, it is understood that the data packets may include any type of consistent-rate data.

The processor 104 deactivates the data transmitter 102 for a deactivation interval $T_1$. Deactivation refers to either completely or partially disabling the data transmitter 102 so that it draws less power from the power source 110. During the deactivation interval $T_1$, the processor 104 communicates the media data packets to the buffer 108. The media data packets aggregate in the buffer 108 during the deactivation interval $T_1$. At the end of the deactivation interval $T_1$, the processor 104 activates the data transmitter 102. The data transmitter 102 receives the aggregate of media data packets from the buffer 108 and transmits the aggregate over a wireless network. Transmission circuitry 112 may be configured to transmit data over any type of wireless network, such as a Wi-Fi or other network based on IEEE 802.11 or other standard, as examples.

As an example, the data transmitter 102 may be deactivated for an interval $T_1$ if the media data packets that are stored in the buffer 108 are read out of the buffer 108 (and transmitted) at a rate that is greater than the sampling rate of the data received from the data source 106. The rate that the media data packets are read from the buffer 108 and transmitted is dependent on the bandwidth of the network. For example, if the data transmitter 102 is a Wi-Fi device operating according to the IEEE 802.11 g standard, it may transmit data at 25 Mbps. The bit-per-second data rate of the data source 106 is based on the media sample rate. Thus, if the data source 106 were to provide a 64-byte audio sample every ten milliseconds, the bit-per-second data rate of the audio data is 51.2 kbps. In this example, the media data packets are read out of the buffer 108 and transmitted at a much higher rate than the sampling rate of the audio signal (i.e., 25 Mbps>51.2 kbps). Because the media data rate is consistent and will not exceed the rate of data transmission, a deactivation interval $T_1$ may be determined for the data transmitter 102.

The deactivation interval $T_1$ may be communicated to the processor 104 as a predetermined value and/or the processor 104 may be programmed to determine the deactivation interval $T_1$. Whether predetermined or programmable, the deactivation interval $T_1$ is greater than the sum of all transition and processing periods required for transitioning the data transmitter 102 from an active state to a deactivated state, and back to an active state. By way of example, a data transmitter 102 may require 2 ms. to transition from an active to a deactivated state, and 2 ms. to transition from the deactivated state back to an active state. Also, the processor 104 may utilize an additional 1.5 ms. to execute instructions associated with initiating deactivation steps and communicating a deactivation signal to the data transmitter 102. In this example, 5.5 ms. (2 ms.+2 ms.+1.5 ms.) is subtracted from the deactivation interval $T_1$ to determine the actual time that the data transmitter 102 is not drawing power from the power source 110. In this example, the deactivation interval $T_1$ must be at least 5.5 ms., and is preferably much greater.

The data transmitter 102, the processor 104, the buffer 108, and/or the other components shown in FIG. 1 may be part of a WLAN integrated circuit (chip) or other integrated circuit. A WLAN chip may include one or more of the following devices (not shown) in communication with one or more of the components shown in FIG. 1: a baseband processor (BBP), a media access control (MAC) device, a physical-layer (PHY) device, interfaces, firmware, other memory and/ or processors, or any other system on chip (SOC) components. Other integration schemes for the components shown in FIG. 1 are contemplated and within the scope of the invention.

Figure 2:
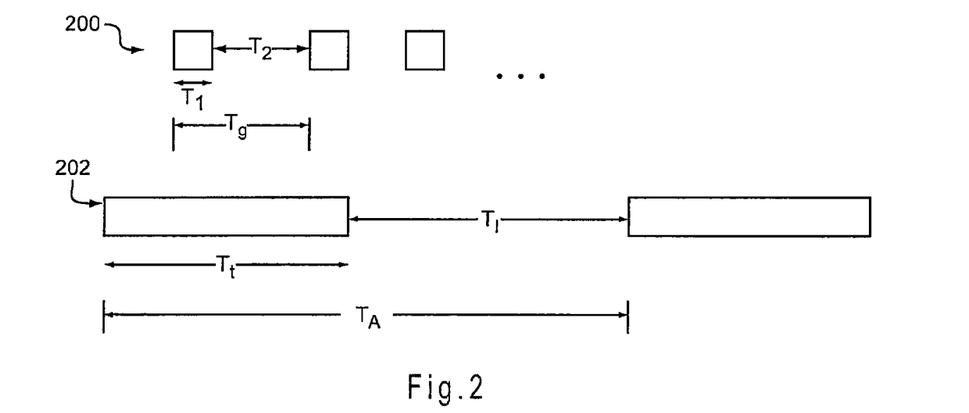
FIG. 2 illustrates a technique for determining a deactivation interval for the data signal transmitter of FIG. 1.

FIG. 2 illustrates a plurality of media data packets 200 that are aggregated into media data packet blocks 202 in the buffer 108. The size of each media data packet 200 corresponds to a transmission time $T_1$. $T_g$ refers to the time interval that would be required to transmit successive un-aggregated media data packets 200. $T_g$ thus also refers to the media data sampling rate, i.e., the data rate of the data source 106. In the example above, $T_g$=10 ms. $T_2$ refers to the interval that the data transmitter 102 is not transmitting any data (because the data transmitter 102 transmits at a higher rate ($T_1$) than $T_g$). $T_2$ is increased to $T_1$ because media data packets 200 are aggregated in the buffer 108, and then transmitted at the higher transmit rate of the data transmitter 102.

The following example provides values for the time periods discussed above. The example is provided to illustrate the principles of media-type data aggregation and is not to be interpreted as limiting the scope of the invention in any way. In this example, the data source 106 provides a 64-byte audio sample every 10 ms. Thus, $T_g$=10 ms. and the data rate of the data source 106 is 5.12 kbps. If ten packets are aggregated in the buffer 108 for each transmission, $T_A$=100 milliseconds. If the transmit rate is 256 kbps, $T_t$=20 milliseconds. Thus, $T_1$=80 ms. Assuming the processing and transition periods discussed above (5.5 ms.), the actual time that the data transmitter 102 is not drawing power from the power source 110 (i.e., the actual time that the data transmitter 102 is in a deactivated state) is 74.5 ms. In this example, the power consumed by the data transmitter 102 is reduced by 74.5%.

Figure 3:
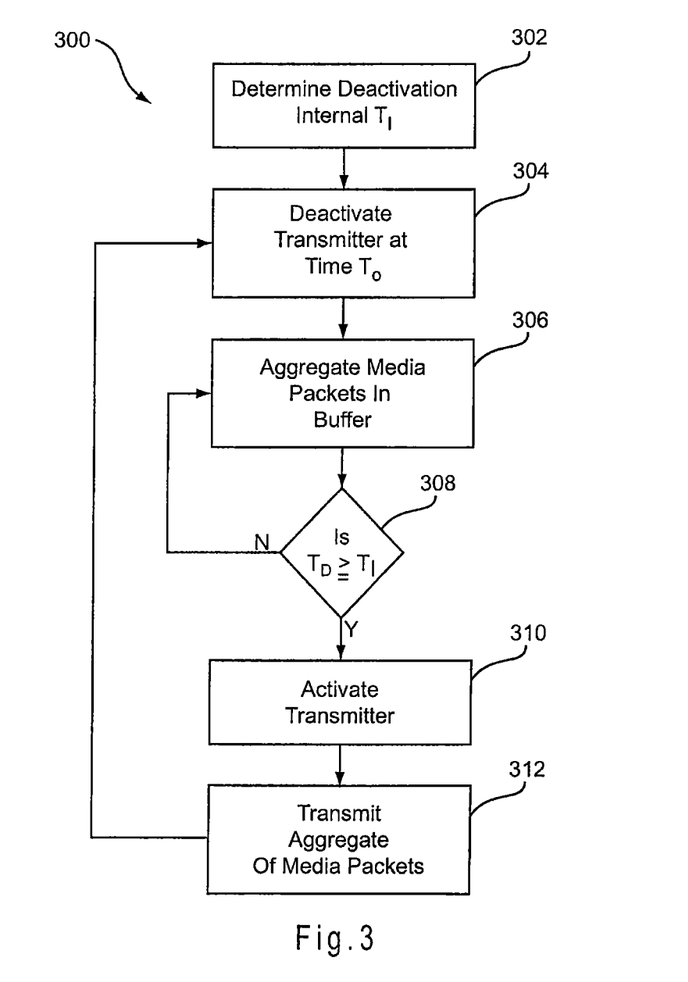
FIG. 3 shows acts for activating and deactivating a data signal transmitter in intervals, according to an embodiment of the invention.

FIG. 3 shows Acts 300 for activating and deactivating a data transmitter in intervals, according to an embodiment of the invention. One or more of the Acts 300 may be performed by the processor 104, as an example, or any other device. In a version, it may first be determined or verified whether data to be transmitted is substantially consistent-rate data. A deactivation interval $T_1$ is determined (Act 302) for transmitting substantially consistent-rate data, such as media data, received from a data source. The deactivation interval $T_1$ may be a predetermined deactivation interval or may be determined (by a processor or other device) based on the number of media data packets to be aggregated (without exceeding the capacity of an aggregation buffer or memory). The deactivation interval $T_1$ preferably allows a receiving device to continue to process the media data at the sampling rate. In other words, the deactivation interval $T_1$ preferably does not exceed the sampling rate multiplied by the number of media data packets that are aggregated in the buffer. The deactivation interval $T_1$ may be predetermined and communicated to a processor as a value and/or a processor may determine the deactivation interval $T_1$ based on one or more factors, such as the capacity of the buffer, the sampling rate, the number of media data packets that may be aggregated, or other factors.

The data transmitter is deactivated (Act 304). The start of the deactivation interval may be designated as $T_o$. Media data packets are aggregated in the buffer while the data transmitter is deactivated (Act 306). The media data packets continue to aggregate in the buffer if the real time deactivation interval ($T_D$)<$T_1$ (Act 308). If $T_D \geq T_1$, the data transmitter is activated (Act 310), and the aggregate of media data packets are transmitted (Act 312). The aggregate of media data packets may be transmitted in a Transmit Opportunity (TXOP) burst transmission, as an example. A TXOP is a bounded interval during which the transmitting device may transmit as many data packets (or multiplexed data packets) as possible. After the aggregate of data packets are transmitted, the transmitter may again be deactivated (return to Act 304).

Figure 4:
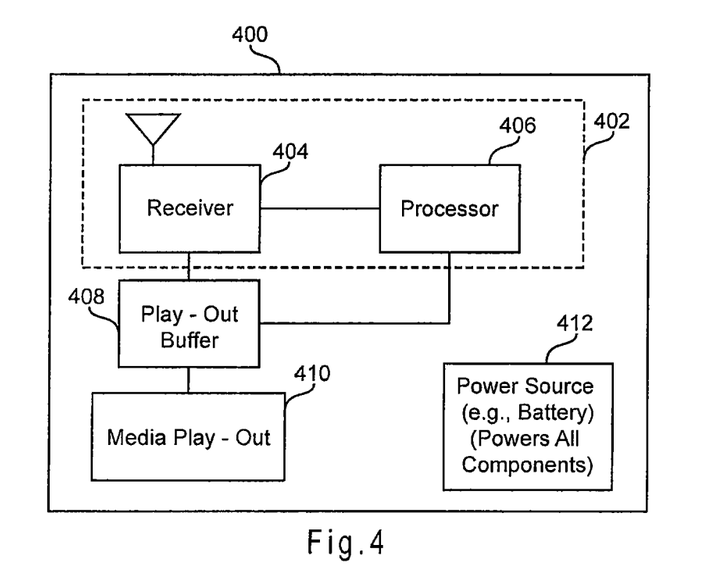
FIG. 4 illustrates a wireless device having a receiver circuit that transitions a wireless signal receiver to a sleep mode for an interval determined by the level of data in a play-out buffer, according to a disclosed embodiment.

Turning next to systems and methods for decreasing the amount of power consumed by a wireless signal receiver, FIG. 4 illustrates a wireless device 400 having a receiver circuit 402. The receiver circuit 402 reduces power consumption by transitioning a receiver 404 to a sleep mode for intervals that are defined by the level of data in a play-out buffer 408. Sleep mode is a power saving mode and refers to either completely or partially disabling the receiver 404 so that it draws less power from the power source 412.

The device 400 may be any type of wireless device such as a lap-top computer, personal digital assistant, multi-media Internet enabled phone, portable media player, a device operable in a wireless local area network (WLAN) or other network, or any other device having a receiver circuit 402 and a power source 412. The receiver circuit 402 may be a WLAN interface chip, an ASIC, or other circuit or system having or in communication with the receiver 404, as examples.

The receiver 404, a processor 406, the play-out buffer 408, and/or the other components shown in FIG. 4 may be part of a WLAN integrated circuit (chip) or other integrated circuit. A WLAN chip may include one or more of the following devices (not shown) in communication with one or more of the components shown in FIG. 4: a baseband processor (BBP), a media access control (MAC) device, a physical-layer (PHY) device, interfaces, firmware, other memory and/or processors, or any other system on chip (SOC) components. Other integration schemes for the components shown in FIG. 4 are contemplated and within the scope of the invention.

The receiver 404 receives data packets from a transmitting device (not shown). The receiver circuit 402 reads media data from the received data packets and communicates the media data to the play-out buffer 408. A media play-out device 410 receives the media data from the play-out buffer 408 at a media play-out rate and communicates media signals to a play-out component such as a speaker or display (not shown).

In the illustrated embodiment, the receiver 404 and the play-out buffer 408 are in communication with the processor 406. The processor 406 monitors the level of data buffered in the play-out buffer 408. When the level of data in the play-out buffer 408 is greater than or equal to a first threshold (high watermark level), the processor 406 communicates a message to a data transmitter (which may be the receiver 404 if the receiver 404 is a transceiver) to send a message to the transmitting device to stop transmitting data packets. The processor 406 also communicates a signal to the receiver 404 to transition it to sleep mode.

While the receiver 404 is in sleep mode, the processor 406 continues to monitor the level of media data buffered in the play-out buffer 408. The level of media data in the play-out buffer 408 will decrease as it is communicated to the media play-out device 410. When the level of data in the play-out buffer 408 is less than or equal to a second threshold (low watermark level), the processor 406 communicates a signal to the receiver 404 to transition to an active state. The processor 406 also communicates a message to the data transmitter (which, again, may be the receiver 404 if the receiver 404 is a transceiver) to send a message (transmit message) to the transmitting device to resume data packet transmissions. The receiver circuit 402 may (optionally) implement any additional power saving technique while activated to receive data packets. Exemplary optional power saving techniques include the IEEE Power Save for Infrastructure Mode, the IEEE Power Save for Independent Basic Service Set (IBSS)

Mode, and the IEEE 802.11 Automatic Power Save Delivery (APSD) power save technique.

While the receiver 404 is in sleep mode, the transmitting device (which is in communication with the media data source) may buffer media data packets in a transmit buffer. The transmitting device may implement the power saving technique discussed above with reference to FIGS. 1-3 or may implement any other technique to temporarily cease data transmissions intended for the receiver 404. When the transmitting device receives the transmit message from the device 400, it transmits the buffered media data packets. The transmitting device may transmit the buffered media data packets in a Transmit Opportunity (TXOP) burst transmission, as an example.

In the embodiment shown in FIG. 4, the power saving technique is implemented as an asynchronous event of the receiver circuit 402, meaning that the receiver circuit 402 determines when to go into the sleep mode independent of the transmitting device. The transmitting device follows the instructions (to transmit or not transmit data packets) contained in the messages from the receiving device 400. It is noted that the transmitting device may implement the power saving technique discussed above with reference to FIGS. 1-3 as an asynchronous event if the receiving device 400 does not implement the power saving technique discussed herein. Also, the transmitting device may implement the power saving technique discussed above with reference to FIGS. 1-3, and may communicate with a receiving device 400 that implements the power saving technique discussed with reference to FIGS. 4-6. However, in this case, the power saving technique implemented by the transmitting device is not asynchronous and may require modification to account for the dependence on the transmit control messages (to transmit or not transmit data) received from the receiving device 400.

Figure 5:
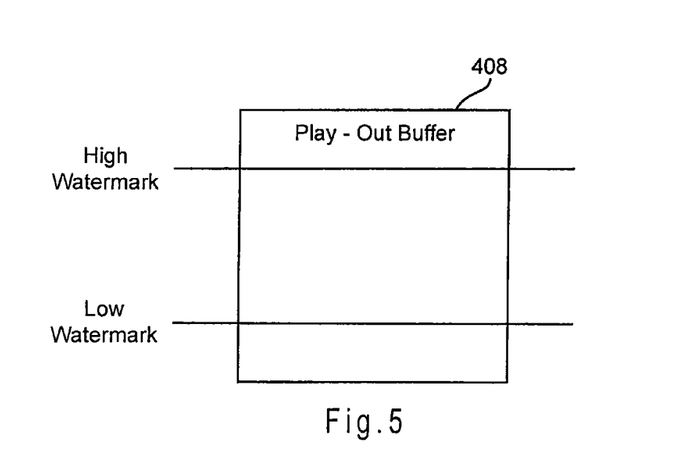
FIG. 5 illustrates a technique for determining whether to transition the wireless signal receiver of FIG. 4 into or out of sleep mode, according to a disclosed embodiment.

FIG. 5 illustrates the high and low watermark levels discussed above for the play-out buffer 408. The high watermark may be programmed in the receiver circuit 402 as a predetermined value and/or the receiver circuit 402 may be programmed to determine the high watermark. Whether predetermined or programmable, the high watermark is limited by the capacity of the play-out buffer 408. The high watermark may optionally additionally account for a user's perception of the initial play-out delay (i.e., waiting for the play-out to begin) that occurs between the time a user requests playback and when the media data reaches the high watermark in the play-out buffer 408. If it is desired to have a shorter initial play-out delay, the high watermark level may be set at a relatively lower level.

The low watermark may be programmed in the receiver circuit 402 as a predetermined value and/or the receiver circuit 402 may be programmed to determine the low watermark. Whether predetermined or programmable, the low watermark preferably factors into account the sampling period of the media data. For example, if the sampling period is 10 ms. the receiver circuit 402 must be activated in time to receive a media data packet from the transmitting device within 10 ms. of the play-out buffer having communicated its last media data sample to the media play-out device 410. This will ensure continuous media play. In addition, the low watermark may also account for the wake-up latency of the receiver circuit 402 and include a margin to account for possible wireless jitter and retransmission requests. The low watermark may take into account other timing constraints.

Figure 6:
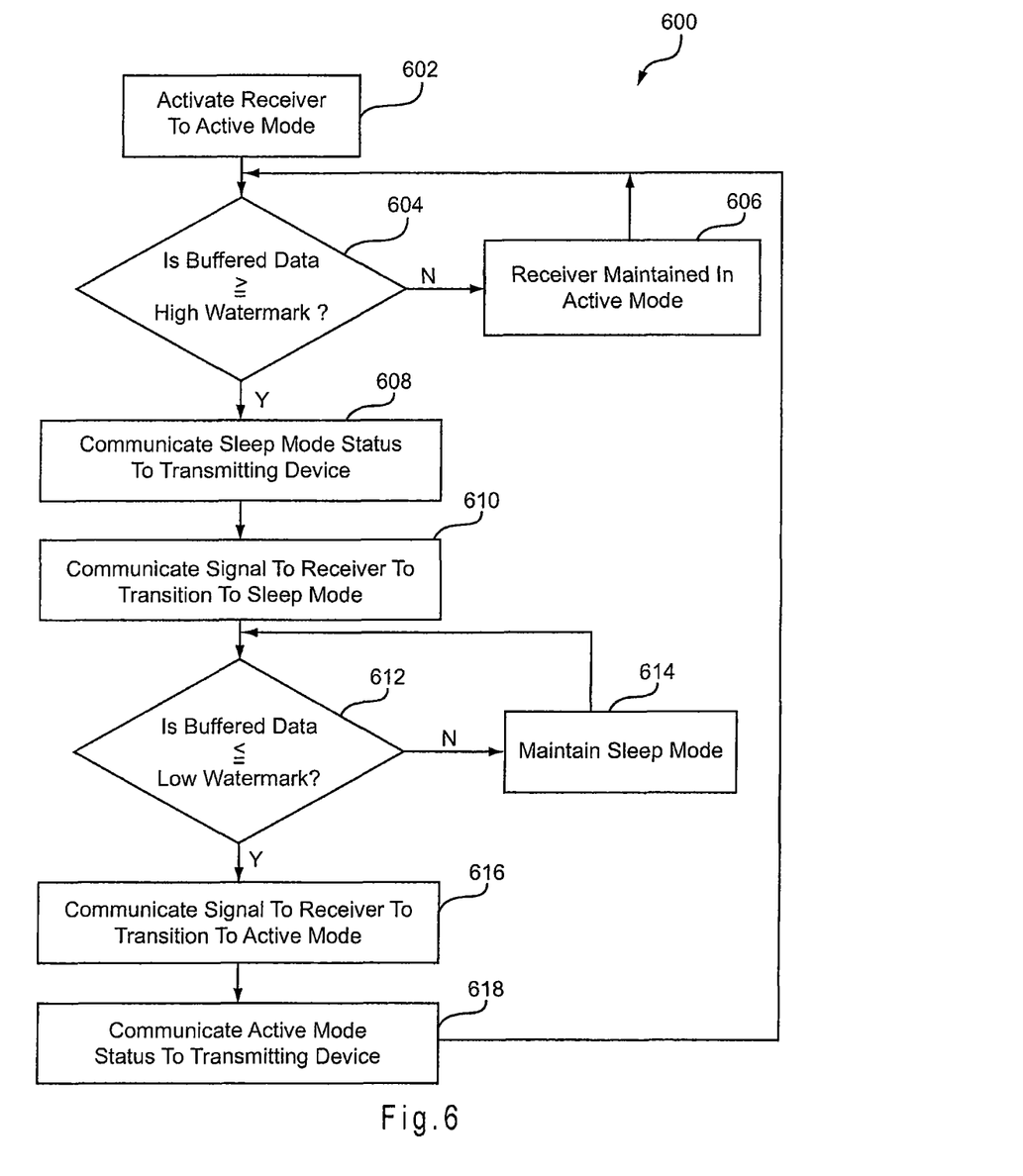
FIG. 6 shows acts for transitioning a wireless signal receiver into and out of sleep mode, according to a disclosed embodiment.

FIG. 6 shows Acts 600 for transitioning a data receiver into and out of sleep mode, according to an embodiment of the invention. The Acts 600 may be implemented by hardware, firmware and/or software that comprise the receiver circuit 402 or other circuit, as examples. The data receiver is activated (Act 602) to active mode to receive media data packets via a wireless signal from a transmitting device, and communicate media data to a memory. The level of media data accumulated in the memory is monitored (Act 604). The receiver is maintained in active mode if the level of accumulated media data is less than a high watermark (Act 606). When the level of media data reaches or exceeds the high watermark, acts are executed to enter sleep mode: a first signal is communicated to the receiving device's transmitter (which may be included in the receiver if the receiver comprises a transceiver). The first signal causes the transmitter to transmit a message to the transmitting device to stop transmitting the media data packets (Act 608); a second signal is communicated to the receiving device's receiver to cause it to transition to sleep mode (Act 610). The second signal may be the same as the first signal or may be a separate signal.

The level of media data in the memory is monitored (Act 612) as the media file is played. The receiver is maintained in sleep mode while the level of media data in the memory is greater than a low watermark (Act 614). When the level of media data falls to or below the low watermark, acts are executed to transition the data receiver to active mode: a first signal is communicated to the receiver to transition the receiver to active mode (Act 616); a second signal is communicated to a transmitter (which may be the receiver if the receiver comprises a transceiver) to send a message to the transmitting device to resume data transmissions (Act 618). The acts may return to Act 604, as illustrated.

All of the discussion above, regardless of the particular implementation being described, is exemplary in nature, rather than limiting. Although specific components of the transmission circuit 112 and the receiver circuit 402 are described, methods, systems, and articles of manufacture consistent with the transmission circuit 112 and the receiver circuit 402 may include additional or different components. For example, components of the transmission circuit 112 and/or the receiver circuit 402 may be implemented by one or more of: control logic, hardware, a microprocessor, microcontroller, ASIC, discrete logic, or a combination of circuits and/or logic. Further, although selected aspects, features, or components of the implementations are depicted as hardware or software, all or part of the systems and methods consistent with the transmission circuit 112 and/or the receiver circuit 402 may be stored on, distributed across, or read from respective machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of either system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method comprising:
calculating a deactivation time interval based on a substantially consistent data rate and a capacity of a buffer, wherein the deactivation time interval corresponds to a transmitter deactivation interval;
communicating the deactivation time interval to a processor configured to activate and deactivated a data transmitter periodically and according to at least the deactivation time interval;
receiving, at the processor, data from a data source at the substantially consistent data rate;
aggregating a plurality of data packets for a second time interval to a buffer, wherein the data packets include the data;
wirelessly transmitting, by a data transmitter, the plurality of data packets from the buffer; and
deactivating, by the processor, the data transmitter during the deactivation time interval.

2. The method of claim 1 further comprising determining the second time interval based on a data rate of the data received from the data source.

3. The method of claim 2 wherein the data rate is a sampling rate of playback data.

4. The method of claim 1 wherein deactivating the data transmitter comprises partially disabling the data transmitter.

5. The method of claim 1 wherein the aggregated plurality of data packets are transmitted within a transmit opportunity burst transmission.

6. The method of claim 1 further comprising determining whether the data source is providing substantially consistent-rate data.

7. The method of claim 1 wherein the second time interval is predetermined.

8. An apparatus comprising:
a memory in communication with a data transmitter; and
a processor to deactivate the data transmitter for a first time interval and communicate a plurality of data packets to the memory while the data transmitter is deactivated;
wherein the data transmitter is activated by the processor after the first time interval to transmit the plurality of data packets as an aggregate, and
wherein the processor determines the first time interval prior to data transmission based on a data rate of the data that comprises the plurality of data packets and a capacity of the memory.

9. The apparatus of claim 8 wherein the data rate is a sampling rate of media data.

10. The apparatus of claim 8 wherein the processor determines whether the data is consistent-rate data.

11. The apparatus of claim 8 wherein the first time interval coincides with a second time interval during which the plurality of data packets are communicated to the memory.

12. The apparatus of claim 8 wherein the data transmitter transmits the plurality of data packets within a transmit opportunity burst transmission.

13. A method comprising:
receiving a first plurality of media data packets;
aggregating the first plurality of media data packets in a memory while a wireless data transmitter is deactivated, wherein the wireless data transmitter is deactivated for a time interval that is determined prior to data transmission based on a sampling rate of the media data, a transmit rate of the wireless data transmitter, and a number of media packets aggregated in the memory;
activating the wireless data transmitter;
transmitting the first plurality of media data packets as a first aggregate;
aggregating the second plurality of media data packets while the wireless data transmitter is deactivated; and
transmitting the second plurality of media data packets as a second aggregate.

14. The method of claim 13 further comprising receiving a signal indicating whether data to be transmitted is media data, and deactivating the wireless data transmitter if the data is media data.

15. The method of claim 13 further comprising receiving media data while the wireless data transmitter is activated and deactivated.

16. The method of claim 13 wherein deactivating the wireless data transmitter comprises partially disabling the wireless data transmitter.

17. An apparatus comprising:
a wireless data transmitter;
a buffer configured to aggregate media data packets; and a processor to:
activate the wireless data transmitter to transmit a first plurality of media data packets as a first aggregate,
deactivate the wireless data transmitter while a second plurality of media data packets are aggregated in a memory as a second aggregate, wherein the processor deactivates the wireless data transmitter for a time interval that is determined prior to data transmission based on a sampling rate of media data and a transmit rate of the wireless data transmitter, and a size of the buffer; and
activate the wireless data transmitter to transmit the second plurality of media data packets as a second aggregate.

18. The apparatus of claim 17 wherein the second aggregate is different than the first aggregate.

19. The apparatus of claim 17 wherein the processor receives media data and forms the first and second plurality of media data packets while the wireless data transmitter is activated and deactivated.

20. The apparatus of claim 17 wherein deactivating the wireless data transmitter comprises partially disabling the data transmitter.

21. An apparatus comprising:
a processor to form a plurality of data packets from data received from a data source at a consistent rate;
a memory to receive and aggregate the plurality of data packets; and a wireless data transmitter to transmit the aggregated plurality of data packets,
wherein the processor is configured to deactivate the wireless data transmitter for a time interval after the wireless data transmitter transmits the aggregated plurality of data packets, wherein the time interval is determined prior to data transmission based on the consistent rate and a capacity of the memory.

* * * * *